(No Model.)
J. B. DYSON & S. K. PARAMORE.
SHAFT COUPLING.
No. 249,324.　　　　　　　　　　Patented Nov. 8, 1881.
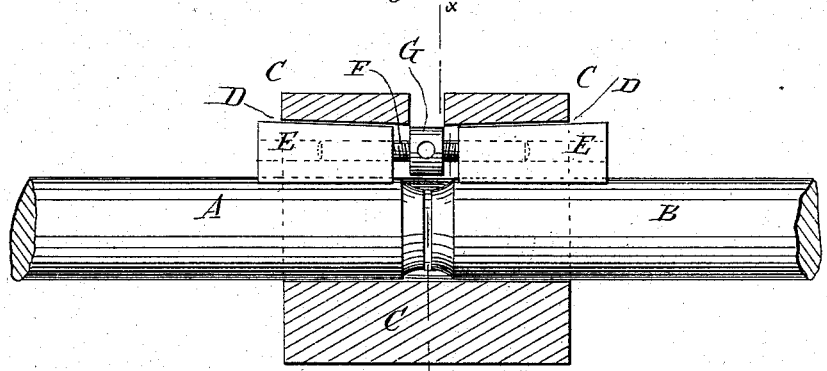
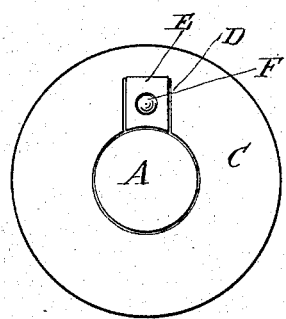 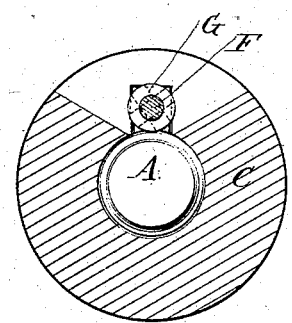
WITNESSES:　　　　　　　　　　　　INVENTOR:

UNITED STATES PATENT OFFICE.

JOHN B. DYSON AND SAMUEL K. PARAMORE, OF NEW BRITAIN, CONN.

SHAFT-COUPLING.

SPECIFICATION forming part of Letters Patent No. 249,324, dated November 8, 1881.

Application filed August 11, 1881. (No model.)

*To all whom it may concern:*

Be it known that we, JOHN B. DYSON and SAMUEL K. PARAMORE, of New Britain, Hartford county, Connecticut, have invented a new and useful Improvement in Keys for Fastening Shaft-Couplings and other Purposes, of which the following is a specification.

Figure 1 is a sectional side elevation of my improvement. Fig. 2 is an end elevation of the same, and Fig. 3 is a sectional end elevation of the same, taken through the line $x\ x$, Fig. 1.

Similar letters of reference indicate corresponding parts.

The object of this invention is to facilitate the connection of the adjacent ends of shafts and the making of other connections, and to promote security in the said connections.

A B represent the adjacent ends of two shafts. C is a sleeve which fits upon the shafts A B, and has a longitudinal groove, D, formed in its inner surface. The groove D is made half wedge-shape, or is tapered or inclined upon its bottom from its ends toward its center, as shown in Fig. 1.

E are two correspondingly-shaped keys, the outer sides of which are inclined to fit against the inclined bottom of the groove D. The inner sides of the keys E are concaved or flat to rest upon the sides of the shafts A B. One of the keys E has a right screw-hole and the other a left screw-hole cut through it, into which fit the threads of the right and left screw F. The middle part of the screw F is enlarged or has a collar, G, formed upon or attached to it, in which are formed a number of radial holes, to receive the end of a pin to serve as a lever or handle for turning the said screw.

With this construction, when the screw F is turned in one direction the keys E are drawn inward and clamp the ends of the shafts A B securely, and when the said screw F is turned in the other direction the keys E are pushed outward to release the said shafts. The sleeve C is slotted transversely opposite the center of the screw F to allow the lever or handle to be inserted in the holes in the collar G and operated to turn the screw F.

In some situations and for some uses—as for instance, for securing dies in their beds—the screw F will have a screw-thread upon its forward end only, and will have a head formed upon its other end to rest against the outer end of one of the keys E. Or the screw F, instead of having a collar at its center, can have a head at one end, so that it can be turned from the end instead of from the center. In this case the part of the screw next the head and the corresponding hole in one of the keys E should be larger than the other end and the corresponding hole in the other key, so that the forward end of the said screw can be passed through the larger screw-hole in the one key before engaging with the screw-hole in the other key.

Having thus described our invention, we claim as new and desire to secure by Letters Patent—

The combination, with the two keys E E and the coupler-sleeve C, having the groove D, and a median transverse slot, of the single right and left screw F, having the middle collar G with radial holes, whereby said screw may be operated by a pin, as described.

JOHN BENJAMIN DYSON.
SAMUEL KIRKLAND PARAMORE.

Witnesses:
C. R. BAILEY,
ANDREW TURNBULL.